United States Patent [19]

André et al.

[11] Patent Number: 4,758,969
[45] Date of Patent: Jul. 19, 1988

[54] DEVICE FOR MEASURING BRAKE TEMPERATURES AND TIRE PRESSURE ON SETS OF WHEELS OF VEHICLES AND IN PARTICULAR AIRCRAFT

[75] Inventors: Sinic André ; Preux Patrick, both of Paris, France

[73] Assignee: Precision Mecanique Labinal, Montigny-Le-Bretonneux, France

[21] Appl. No.: 827,880

[22] Filed: Feb. 10, 1986

[30] Foreign Application Priority Data

Feb. 21, 1985 [FR] France ................. 85 02487

[51] Int. Cl.⁴ .............................................. B60C 23/04
[52] U.S. Cl. .................................. 364/557; 364/558; 364/424; 340/58; 340/52 F
[58] Field of Search ............... 364/557, 558, 550, 551, 364/424; 340/52 R, 52 F, 52 C, 58; 73/126, 121, 39, 45.6, 49

[56]  References Cited
U.S. PATENT DOCUMENTS

3,790,910  2/1974  McCormack ...................... 364/558
4,103,283  7/1978  Lee ..................................... 340/58
4,148,008  4/1979  Lusk et al. .......................... 340/58
4,192,005  3/1980  Kurtz ................................ 364/571
4,275,377  6/1981  Matsuda et al. .................... 340/58
4,283,707  8/1981  Church ............................... 340/58
4,312,042  1/1982  Bateman ........................... 364/463
4,348,654  9/1982  Matsuda et al. .................... 340/58
4,399,515  8/1983  Gross ................................ 364/571
4,467,641  8/1974  Abraham ............................ 340/58
4,468,968  9/1984  Kee .............................. 364/558 X

Primary Examiner—Parshotam S. Lall
Assistant Examiner—Thomas G. Black
Attorney, Agent, or Firm—Larson & Taylor

[57]  ABSTRACT

The device comprises a central BTMS computer and a central TPIS computer, for each set of wheels, a bus (a,b,c,d,e) leading to the temperature sensors (21,22,23 and 24), and, through a coupling (8,9,10,11), to the pressure sensors (16,17,18,19) with means for frequency coding the pressure and temperature, a TPIS supply source (2) and multiplexing means sending, through the buses, the temperature data to the BTMS computer and the pressure data to the TPIS computer.

13 Claims, 5 Drawing Sheets

DEVICE FOR MEASURING BRAKE TEMPERATURES AND TIRE PRESSURE ON SETS OF WHEELS OF VEHICLES AND IN PARTICULAR AIRCRAFT

The present invention relates to a device for measuring brake temperatures and tire pressures on sets of wheels of vehicles and in particular aircraft.

Aircraft, and in particular aircraft of airlines, are at the present time equipped with a device for measuring the temperatures of the wheel brakes. This device comprises, for each wheel brake of each of the sets of wheels which may be braked, a temperature sensor and possibly means for converting into a coded signal, for example a frequency coded signal, the normally dc electrical signal generated by the temperature sensor, these means being connected to a central computer usually located in the baggage compartment of the aircraft, by a group of conductors pertaining to each set of wheels. Thus, generally, for a set of four wheels, the group of conductors will comprise five conductors, for example in the insulated twisted form, namely four wheel conductors and a conductor common to the group of four wheels.

In existing aircraft, there can of course be no question of modifying the location and the arrangement of these conductors. Further, in aircraft to be constructed, it is not desirable to modify these arrangements of conductors whose geometry had been determined in accordance with the geometry of the aircraft.

The applicant has already developed a device for measuring the pressures in the tires of wheels, and notably of sets of wheels, in particular for aircraft. This device comprises, on the rotating part of each wheel, a pressure sensor and associated electronic means for converting the signal delivered by the sensor into data coded in frequency between 50,000 Hz and 100,000 Hz. The coupling between the wheel electronic system and a computer for processing the pressure data received may be through a rotating transformer whose secondary winding is carried by the wheel and rotates therewith in front of a primary winding carried by the fixed structure of the wheel, the latter being connected by conductors to the computer. The power is supplied to the electronic means mounted on the wheel from a source mounted on the fixed part of the aircraft and supplying the electronic means of the wheel with a power at a frequency of about 3,000 to 3,500 Hz passing through this rotating transformer.

The advantages of such a device, apart from its simplicity, reside in the very high reliability obtained, it being possible to use the pressure data notwithstanding the extremely severe and variable electromagnetic environment to which the aircraft is exposed.

An object of the present invention is to provide a device for measuring the brake temperatures and tire pressures on the sets of wheels of vehicles, and in particular aircraft, which is simple and reliable.

Another object of the invention is to provide such a device which does not require the mounting of conductors which are in addition to, or different from, the groups of conductors already existing on the aircraft for transmitting, between the sets of wheels and the temperature computer, brake temperature data.

Another object of the invention is to make it possible to use, in such a device, the already existing brake temperature computer.

In the following description, the brake temperature measuring system will be designated by the abbreviation BTMS and the tire pressure measuring system will be designated by the abbreviation TPIS.

A further object of the invention is to permit the use, in such a device, of a common power supply for the brake temperature measuring means and the tire pressure measuring means.

The invention provides a device for measuring brake temperatures and tire pressures on sets of wheels of vehicles, and in particular aircraft, comprising:
a BTMS central computer,
for each set of wheels, a group or bus of conductors extending between the BTMS central computer and the set of wheels,
on each fixed part of the wheels of the set of wheels, a temperature sensor connected to said group of conductors,
said device further comprising:
on each wheel of the set of wheels, a pressure sensor and associated electronic means for frequency coding the pressure data,
between each wheel and each fixed part of the wheel, a coupling element, preferably a rotating transformer,
on the fixed structure of the vehicle, a TPIS supply source, at a frequency permitting the passage of the power supply through the coupling element of each wheel to said electronic means associated with the pressure measuring sensor,
on the fixed structure of the vehicle, a TPIS computer responsive to the frequency coded signals coming from said electronic means associated with the sensor and passing through the coupling element,
said coupling elements of the wheels of each set of wheels, on one hand, and said TPIS computer and the supply source, on the other hand, being interconnected by said group of conductors,
electronic means associated with the temperature sensor for frequency coding the temperature data,
and multiplexing means for sending to the BTMS central computer solely the temperature data and to the TPIS central computer solely the pressure data.

Preferably, the TPIS elements correspond to the device disclosed in French Pat. No. 8,027,676 filed on Dec. 29, 1980, in which the TPIS supply source supplies electrical power at a frequency lower than 10 kHz and preferably lower than 5 kHz, said means associated with the sensor generate a signal having a frequency which varies within a wide band between 20 and 100 kHz, and the coupling between the rotatable element and its axle is effected by a transformer in the form of a rotating machine whose fixed primary winding is mounted on the axle and whose rotary secondary winding is mounted on the wheel and whose structure allows the passage of a wide pass band between the frequency of the generator and 100 kHz.

Preferably, the electronic circuit associated with the sensor includes a voltage/frequency converter which converts a voltage constituting the signal delivered by the sensor into a frequency which is a function of said voltage.

According to another advantageous feature, the processing means responsive to the signal at high frequency comprise a band-pass filter of 20 to 100 kHz.

Preferably, the electrical power generator delivers electrical energy at a fixed low frequency between 2,000 and 5,000 Hz.

The electrical circuit associated with the sensor comprises, on one hand, means connected to the secondary winding of the transformer for supplying the other components of the circuit with a stabilized regulated voltage, and the circuit comprises, on the other hand, a voltage/frequency converter followed by a filtering means and then signal linearization means for converting the high-frequency square signal of the converter into a sinusoidal signal of the same frequency which is input to the secondary winding of the transformer, by means of a capacitive coupling.

There is found on the primary winding on the transformer a carrier wave at the frequency of the generator on which there is superimposed a wave whose frequency varies within a wide range between 20 and 100 kHz.

The band-pass filter is advantageously preceded by a circuit for rejecting the low frequency while the generator, owing to the very high frequency of the signal transmitted from the secondary to the primary winding, may be protected by a simple choke, and the same is true of the stabilized supply means.

The transformer may be advantageously constructed in the form of a rotating machine having multipole stator and rotor, for example having 24 poles. Other transformers may be used, for example of the type having coaxial primary and secondary windings.

In a first embodiment, the BTMS computer and the TPIS computer are constructed in the form of a single computer controlling preferably the supply source, or in the form of two separate but synchronized computers interconnected for this purpose.

However, in another embodiment, in which it is desired that the BTMS and TPIS circuits be as separated as possible, the two BTMS and TPIS computers are separate and operate in an asynchronous manner.

In a first manner of carrying out the invention, multiplexing means are provided for staggering with respect to time the TPIS transmissions and the BTMS transmissions coming from the respective sensors, in the same measuring channel, i.e. in the conductors of the group of conductors which correspond to the wheel in process of being measured and in which flows at this moment the supply coming from the supply source.

In a second manner of carrying out the invention, the multiplexing means are provided for sending the data, preferably the BTMS data, in a second measuring channel of the same group of conductors so that, by successive circular permutations, it is possible to use the BTMS data at the same time as the TPIS data.

These two manners of carrying out the invention are advantageous in the embodiment in which the two computers are combined in a single computer or are synchronized.

In a third manner of carrying out the invention, adapted to the second embodiment comprising two asynchronous computers, the multiplexing means comprise, in the region of each temperature sensor, means responsive to the presence of a supply frequency in the measuring channel of said temperature sensor for suppressing the transmission coming from the sensor. Consequently, the signal coming from the sensor and sent to its measuring channel is interrupted each time that this measuring channel is used by the TPIS supply, so that the TPIS signal is not disturbed by the temperature measurement. The device further comprises, associated with the BTMS computer, means responsive to the presence of a signal having a frequency corresponding to the supply frequency so as to prevent, when it detects the presence of a supply frequency in any one of the measuring channels, the taking into account of the BTMS measurements, irrespective of the measuring channel transmitting the latter data. Consequently, the TPIS computer is so programmed as to remain inoperative during a certain period of time between two consecutive pressure measuring interrogations and the BTMS computer is so programmed a to be capable of obtaining, during this period of time, at least two consecutive temperature measurements taken into account.

Further features and advantages of the invention will be apparent from the following description which is given by way of a non-limiting example with reference to the accompanying drawings, in which.

Figures 1, 2:
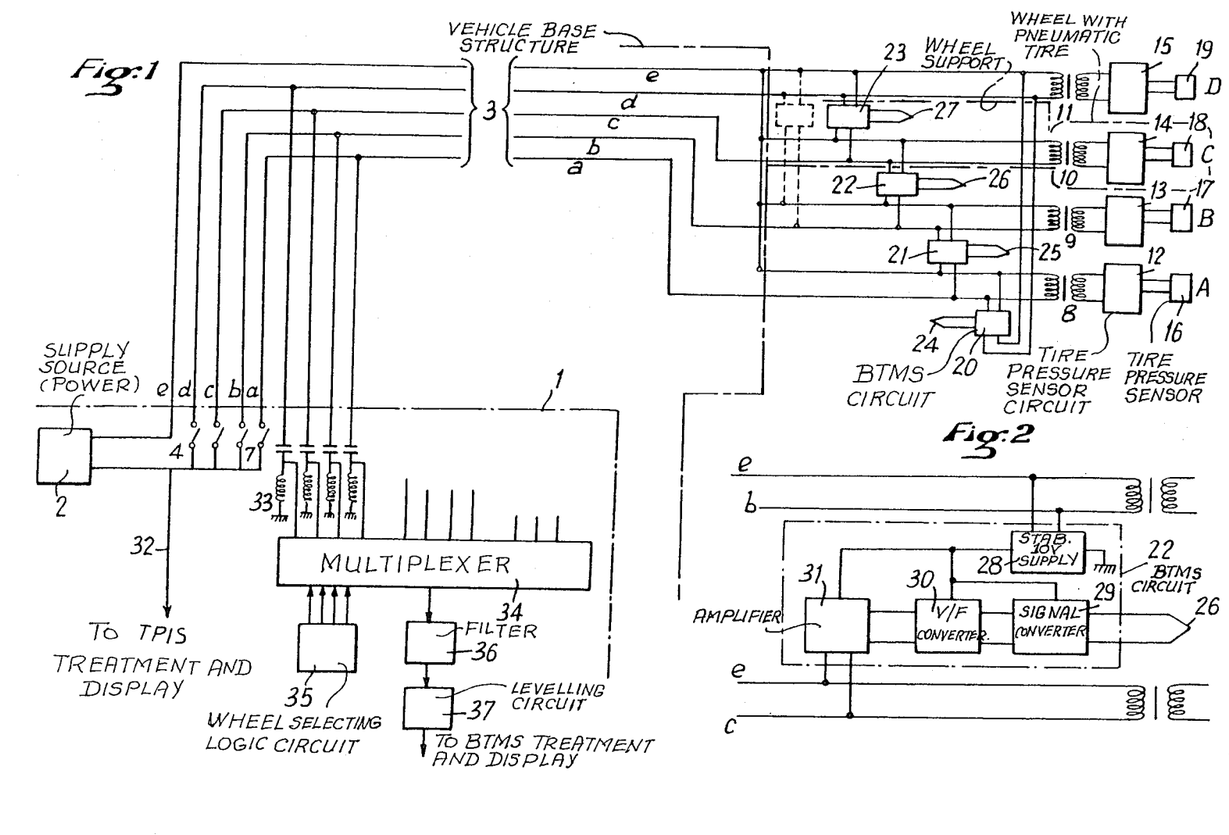
FIG. 1 represents a diagrammatic view of a first embodiment of the invention.
FIG. 2 represents a detail of FIG. 1 in the region of the multiplexing means providing the connection of the temperature sensor and its associated means to the consecutive measuring channel.

Reference will first be made to FIGS. 1 and 2.

The device comprises a central computer 1 represented by the dot-dash lines in FIG. 1 and controlling a supply source at a given frequency, for example 3,125 Hz. Leading from this computer 1 are groups of conductors (or bus), namely a group of conductors per set of wheels, and there is shown at 3 such a group of five conductors a,b,c,d,e, which may easily reach a length of 30 meters in a large aircraft.

Apart from the conductor e, which is the common conductor, the four conductors pertaining to the wheels carrying the reference characters A,B,C,D, namely the conductors a,b,c,d, are connected to the source 2 through switches 4,5,6,7, controlled by the computer 1. More precisely, the computer is so programmed as to successively open and close each of the switches, so that, at a given moment, only one of the switches is closed and the others are open.

As mentioned before, the groups of conductors a,b,c,d,e, lead to the set of wheels A,B,C,D,. In this region, the common conductor e is divided into branches so as to accompany the end part of each of the conductors a,b,c,d. As a modification, there may of course be provided throughout the length of the group 3 a common conductor physically associated with each wheel conductor a,b,c,d, so as to form a twisted pair each time.

As can be seen in FIG. 1, the conductors a,b,c,d, and their associated common conductor e lead to the two terminals of the primary winding of a rotating transformer, respectively 8,9,10,11, whose secondary winding is connected to the electronic circuits 12,13,14,15, respectively associated with the various pressure sensors 16,17,18,19.

The assembly of a pressure sensor and its electronic circuit 12 is so arranged so as to convert the linear signal generated by the pressure sensor into a coded frequency between 50 Hz and 100 kHz which was transmitted to the secondary winding of the rotating transformer 8 and, by means of the coupling provided by the rotating transformer, was injected in the conductor lines a,b,c,d,e. Such an arrangement in described for example in French Pat. No. 8,027,676 filed Dec. 29, 1980.

Current at a frequency of 3,125 Hz is supplied to the electronic circuit 12,13,14,15 in the other direction also by means of the coupling provided by the rotating transformer. Thus it will be understood that, when the supply frequency is sent to one of the lines, for example the line a, the electronic circuit of the corresponding wheel, and only this circuit, namely the circuit 12, is supplied and only the sensor 16 can return its pressure data, coded by the electronic circuit 12, for transmission in the line a. In the vicinity of the fixed parts of the wheels, i.e. of the rotating transformers 8,9,10,11, there are provided the BTMS circuits 20,21,22,23, each associated with a brake temperature sensor 24,25,26,27.

As can be seen from the illustrated connections, the circuit 20 is supplied through the measuring channel corresponding to the same wheel A and formed by the conductor a and the common conductor e, so that the circuit 20 is supplied from the source 2 at the same time as the circuit 12 of the same wheel. On the other hand, the output of the circuit 20 is sent to the adjacent measuring channel formed by the conductors d,e. Likewise, each of the BTMS temperature sensor circuits 21,22,23 is supplied through the channel which corresponds to the wheel whose brake temperature it measures, but transmits its data through an adjacent measuring channel.

FIG. 2 shows a more detailed diagram. For example, the circuit 22 is shown within a rectangle in dot-dash lines. This circuit is supplied through the measuring channel b,e, which sends the supply current of 3,125 Hz to a stabilized 10 V supply device 28 which supplies the other components of the circuit. These comprise a circuit 29 for converting into a direct current the signal coming from the temperature sensor 26, preferably a CROMEL-ALUMEL thermocouple. The signal issuing from the converter 29 is sent to a voltage/frequency converter 30 whose output is connected to a low-frequency amplifier 31 connected to the measuring channel c,e.

The data coming from the measuring channels are received by the computer 1. When one of the switches 4 to 7 validates one of the measuring channels, for example when switch 5 validates the measuring channel c, only the TPIS circuit 14 and the BTMS circuit 23 are supplied with current. The TPIS data coming from the sensor 18 is sent to the measuring channel c,e, the switch 6 being closed, the TPIS data is sent through the line 32 to the TPIS processing means of the computer. Simultaneously, as described before, the BTMS data passes through the channel d,e. It cannot reach the channel 32 because the switch 7 is open. On the other hand, this data is taken up by a branch circuit and is recovered by an LC circuit 33 allocated to the line d, and thence reaches a multiplexer 34 controlled by a wheel selecting logic 35. The signal issuing from the multiplexer passes through a filter 36 of 50 to 100 kHz, then through a levelling means 37 so as to be sent to the BTMS processing means of the computer. The computer 1 may be designed for example to process the BTMS and TPIS signals in an interleaved manner.

Figure 3:
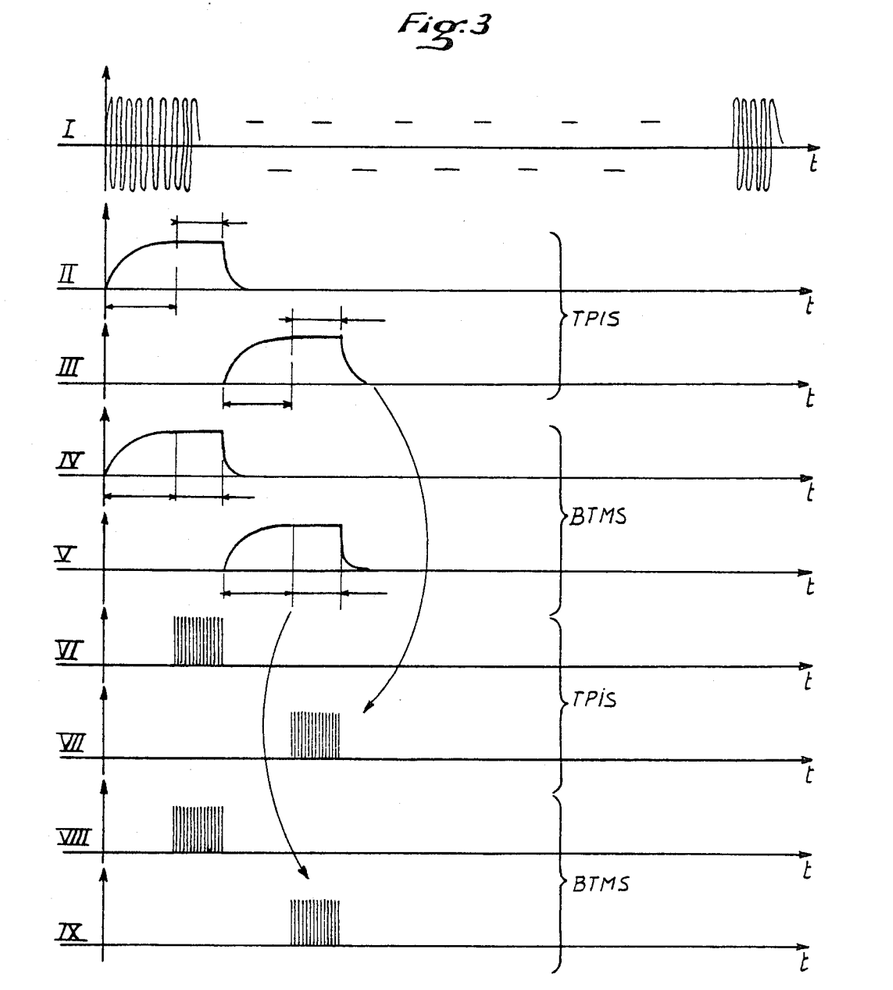
FIG. 3 represents a time chart of a simplified device according to FIGS. 1 and 2 having two measuring channels.

Reference will now be made to FIG. 3 which shows synchronogram for a set of wheels solely having two wheels for purposes of simplification.

The upper diagram I shows the 3,125 Hz frequency supply. The diagram II shows that, with the supply transmited through the channel a, the circuit 12 is supplied and at the end of 15 milliseconds, i.e. at the end of the transitory period, the operation of the circuit 12 is stable. The supply is interrupted at the end of 25 milliseconds. At this moment, it is the channel b which is supplied as can be seen in diagram III. In diagram IV, it can be seen that the circuit 20 of the temperature sensor is supplied at the same time as the circuit 12. At the end of 25 milliseconds, it is, on the contrary, the BTMS circuit 21 which is supplied, as can be seen in diagram V.

Diagrams VI, VIII respectively show the TPIS and BTMS measuring signals of the measuring channel a while the diagrams VII, IX show the TPIS and BTMS measuring signals of the other channel. Each signal lasts 10 milliseconds and is separated from the preceding signal by an interval of 15 milliseconds required for effectively supplying power to the associated electronic circuit.

The device just described permits using the groups of conductors or bus 3 such as they are at present designed and such as they exist on aircraft. The conventional BTMS computer may merely be replaced by the computer 1. Of course, there could also be used a BTMS computer of a conventional type to which is added a TPIS computer which is distinct therefrom with a synchronization of the computers, for example by means of the source 2 acting as a clock. At the other end of the group of conductors or bus 3, the various connections may be achieved by a connection box in the region of the set of wheels so that the bus may be retained in its usual state.

Further, the fact of using for detecting the BTMS temperature an active circuit with the aid of the circuits 20,21,22,23 supplied with current from the source 2, results in an improved precision and above all enables the measuring signal to be converted into coded data, for example into a frequency code.

It will be understood that other coding means could possibly be used, such as data coded in binary words, for example in the FSK form, which however requires a more complicated electronic system in respect of both the sets of wheels and the computer.

The device may moreover be used in accordance with the invention for transmitting additional parameters. Thus, a bus having four measuring channels, such as the bus 3, may transmit also a third data which is different from the temperature and pressure, such as for example a speed of rotation of the wheels, and there has been for example shown for the channel d, on the left side of the circuit 23, a circuit associated with a corresponding speed sensor shown in dotted lines which, when it is supplied at the same time as the circuits 15 and 23, transmits its data not to the channel c, as does the circuit 23, but to the channel b. Thus, for each wheel, there may be obtained such an additional parameter and the corresponding data may be transmitted to the computer through one of the unoccupied measuring channels. Further, it can be seen that, in such a bus having four channels, there would also be provided a fourth measuring device which uses the channel a which is still free when it is supplied through the channel d.

Figure 4:
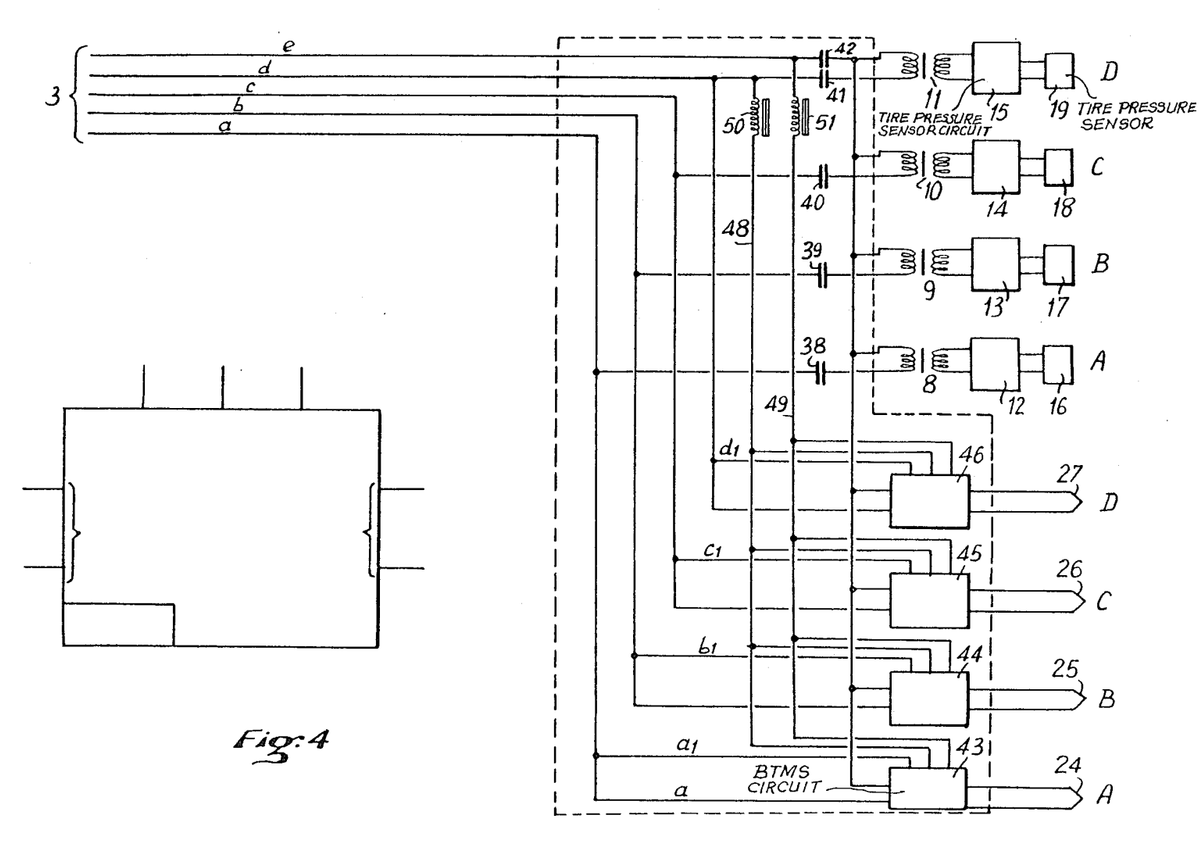
FIG. 4 represents a diagram of the second embodiment in the region of the multiplexing means close to the wheels.
Figure 5:
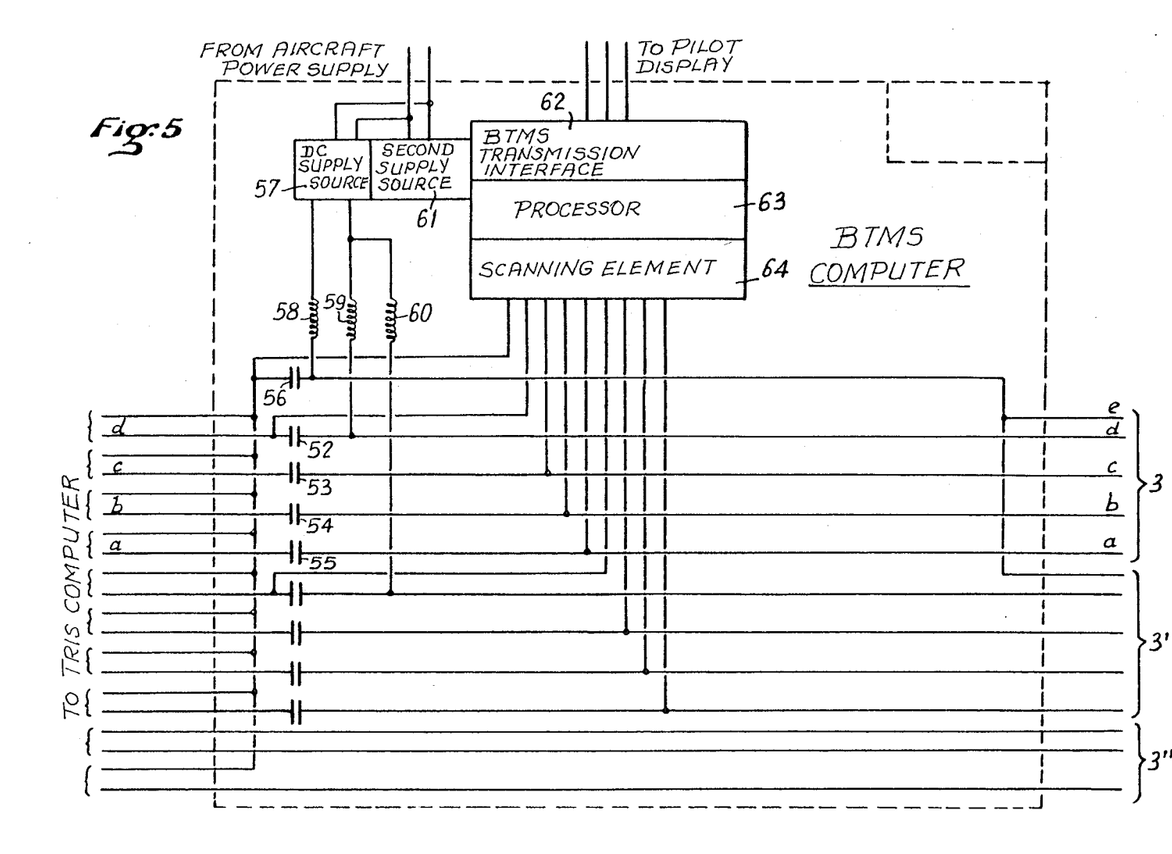
FIG. 5 represents a diagram of this embodiment in the region of the BTMS computer.

Reference will now be made to FIGS. 4 and 5.

In this second embodiment, the device comprises two TPIS and BTMS computers which are separate and operate in an asynchronous mode. FIG. 4 shows a bus comprising four measuring conductors a,b,c,d and a common conductor e, as in the case of the first embodiment. The bus may be connected, on one hand, to the four pressure sensors 16,17,18,19 and, on the other hand, to the four temperature sensors 24,25,26,27 by means of a previously-prepared connection box, as moreover may be arranged in the case of the previously-described embodiment. FIG. 4 shows the periphery of this box in dotted lines.

Inside this box, it can be seen that the connection with the electronic means 12 to 15 associated with the pressure sensor is achieved, in respect of each measuring channel by means of capacitors 38 to 42 adapted to ensure that the dc supply from the BTMS computer does not reach the primary windings of the rotating transformers 8 to 11.

Moreover, it can be seen that each temperature sensor 24 to 27 is connected to its measuring channel through a circuit, namely the circuits 43,44,45, and 46 which are each connected to the common conductor e and to one of the wheel conductors a,b,c,d for transmitting, to these measuring channels the frequency modulated signal which is an image of the temperature. Moreover, it can be seen that these circuits 43 to 46 have, apart from the normal junction to the lines a,b,c,d respectively, a second corresponding junction a1,b1,c1,d1 leading to a part of the circuit 43,44,45 or 46 which, as it is responsive to the presence, in the corresponding measuring channel, of the supply frequency, for example the 3,125 Hz frequency, then stops any BTMS transmission to the measuring channel. In other words, the BTMS temperature data is only transmitted to the corresponding measuring channel in the absence of a supply frequency in this measuring channel. Further, two conductors 44,49 connected for example to the common conductor e and to the conductor d through direct current filtering coils 50,51, permits supplying direct current to the boxes 43 to 46 from a direct current source connected to the box through the conductors d and e.

Consequently, in the region of the set of wheels, it will be understood that the two TPIS and BTMS computers validate in a cyclic manner, but independently of each other, the various measuring channels a,b,c, and d in the following manner:
- the TPIS computer sends the supply pulse trains to the four channels one after the other with a free interval of time between two successive transmissions,
- when the train of supply pulses is sent along one of the channels, the pressure sensor corresponding to the wheel of this channel sends back its TPIS data along the same channel,
- the BTMS sensors send their temperature measuring data simultaneously and without stopping, each one through its measuring channel, except at the moment when a supply train appears in this channel, whereupon the BTMS tranmission along this channel is prevented during the whole supply period.

Reference will now be made to FIG. 5.

Shown in this Figure, within a frame of dotted lines, is the BTMS computer. The latter receives the bus 3 of one of the sets of four wheels, the bus 3' of the other set of four wheels, and the bus 3" comprising only three conductors of the front set of two wheels of the aircraft.

It can be seen that the various measuring channels a,b,c,d of a set of wheels, for example the set 3, issue from the BTMS computer and extend to the TPIS computer through channels located on the left side of the Figure, after having passed through capacitors 52,53,54 and 55 and a capacitor 56 for the channel of the common conductor e, these capacitors serving to protect the TPIS computer from the direct currents travelling through the measuring channels. The dc supply source, shown at 57, supplies direct current, through filtering coils 58,59, to a measuring channel, namely the channel d,e, as already explained hereinbefore.

A second supply 61 supplies current to a group comprising a BTMS transmission interface 62 capable of transmitting to the aircraft piloting station, the results of the BTMS processing effected by a processing logic 63 which receives the BTMS temperature data through a scanning element 64 connected to the various measuring channels. It can be seen that, as concerns the measuring channel, it is connected on the downstream side of the capacitor 52 to avoid a shift due to the supply voltage of the source 57.

This scanning device 64 is responsive to the presence of the train of supply pulses at the frequency of 3,125 Hz in any of the measuring channels of any of the sets of wheels. In the absence of a supply, it authorizes, in the order determined by the processing device 63, the reading of the BTMS data in the chosen measuring channel. In the presence of a supply frequency, it prevents the processing or invalidates it. In this way, there is avoided the risk of considering as a BTMS measurement a signal rendered false by a TPIS measurement, with no need of a device for detecting the supply frequency per set of wheels, which would encumber the assembly.

Figure 6:
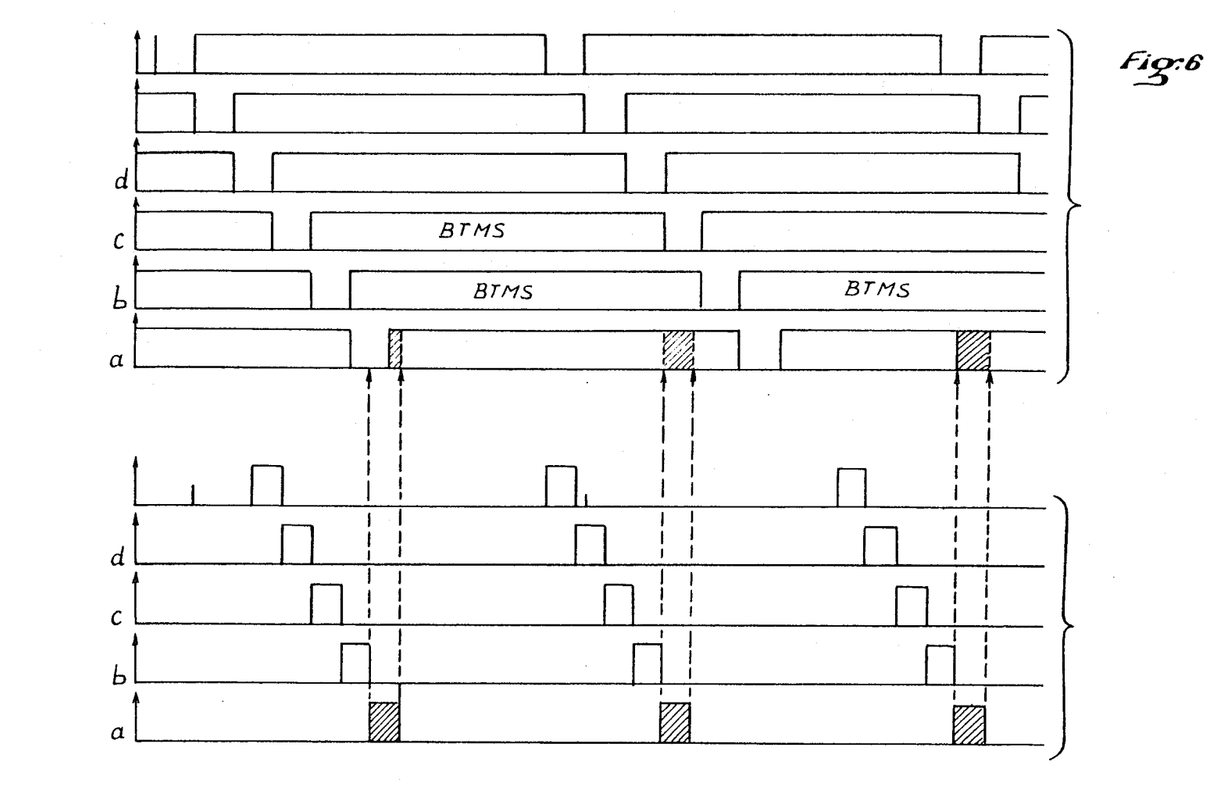
FIG. 6 represents a time chart corresponding to this second embodiment.

With reference to FIG. 6, there can be seen the diagrams of the transmission of the BTMS data by means of the circuits 43 to 46 for the lines a,b,c,d and for the lines of the other sets of wheels. In this diagram, the 3,125 Hz supply source supplies in succession the various channels of the various sets of wheels for a period of for example 25 milliseconds, as in the case of FIG. 1. At any moment, the supply therefore travels through one of the measuring channels. It can be seen from the diagrams of the channels a,b,c,d that the frequency-modulated BTMS data signal is available in the channel except during the 25 milliseconds during which the 3,125 Hz supply travels through this channel. In other words, in a given channel, for example the channel d, the BTMS signal is regularly interrupted.

There has been shown in the lower part the diagram of the taking into account of the BTMS data by the scanning device 64. Thus there has been shown by cross-hatching in the diagram of the channel b, the BTMS data periodically taken up in this channel by the scanning device 64. When, as is the case of the cross-hatched data more to the left, this data extends slightly into a period during which a supply signal is present in the channel a, the device 63 prevents the taking up of this data by the data processing logic 63. On the other hand, the other two successive data signals in the channel a are validated since they occur outside the passage of the 3,125 Hz supply frequency. The rhythms of the scanning of the BTMS and TPIS computers respectively are so chosen that it is possible to receive in one of the measuring channels, for example a, at least two consecutive temperature measurements, as those shown in the middle and on the right of FIG. 6 before a risk of a measurement invalidation.

The embodiment just described permits, in the same way as the foregoing embodiment, not only using the cabling of buses which exist or are already designed on the aircraft, but also rendering the BTMS and TPIS systems completely independent of each other so that, in the event of a breakdown of any element of the TPIS system, the BTMS data continue to be transmitted and to travel through the system for processing.

Although the invention has been described in respect of a particular embodiment, it must be understood that the scope of the invention is in no way intended to be limited thereto and that various modifications may be made therein without departing from its scope or spirit as defined in the appended claims.

What is claimed is:

1. A device for measuring brake temperatures and tire pressures on at least one set of wheels of a vehicle, said vehicle comprising a base structure, the set of wheels comprising a wheel mounting part on which the wheels are mounted for rotation, and a pneumatic tire being mounted on each wheel, said device comprising:
   a BTMS (Brake Temperature Measuring System) central computer,
   a group or bus of conductors extending between and interconnecting the BTMS central computer and the set of wheels,
   temperature sensors connected to said group of conductors and mounted on the wheel mounting part of the set of wheels,
   pressure sensors respectively connected to the pneumatic tires of the wheels for measuring the pressures of the pneumatic tires of the set of wheels, and electronic means respectively connected to the pressure sensors for converting pressure data received from the sensors into corresponding frequency coded pressure signals,
   a coupling element, mounted between each wheel of the set of wheels and said wheel mounting part, which permits electrical signals of predetermined frequencies to pass therethrough,
   a TPIS (Tire Pressure Indicating System) supply source, mounted on said base structure of the vehicle, for supplying an electric power signal at a frequency which enables the passage of the electric power signal through the coupling element of each wheel to said electronic means connected to the pressure sensor,
   a TPIS computer mounted on the base structure of the vehicle and responsive to the frequency coded pressure signals coming from said electronic means and passing through the coupling elements,
   said coupling elements of the wheels of the set of wheels, said TPIS computer and the TPIS supply source being interconnected by said group of conductors,
   electronic means respectively connected to the temperature sensors for converting temperature data from the temperature sensor into frequency coded temperature signals, and
   multiplexing means connected to the group of conductors for sending to the BTMS central computer solely the frequency coded temperature signals and to the TPIS central computer solely the frequency coded pressure signals.

2. A device according to claim 1, wherein said coupling elements comprise rotating transformers including a first rotating winding which is mounted on and rotates with a said wheel and a fixed winding mounted on said wheel mounting part.

3. A device according to claim 1, wherein said TPIS supply source supplies said electric power signal at a frequency lower than 10 kHz, and said electronic means connected to the pressure sensors generates a signal of a frequency which varies over a band between 20 and 100 kHz.

4. A device according to claim 3, wherein said supply source supplies said electric power at a frequency lower than 5 kHz.

5. A device according to claim 1, wherein the BTMS computer and the TPIS computer are in the form of a single computer.

6. A device according to claim 5, wherein the multiplexing means is operative to shift with respect to time the TPIS transmissions and the BTMS transmissions coming from the sensors in the same measuring channels of the group of conductors.

7. A device according to claim 5, wherein the multiplexing means is operative to transmit the frequency coded temperature signals to a second measuring channel of the same group of conductors so as to enable the BTMS data to be used at the same time as the TPIS data.

8. A device according to claim 1, wherein the BTMS computer and the TPIS computer comprise two separate computers.

9. A device according to claim 8, wherein the multiplexing means is operative to shift with respect to time the TPIS transmissions and the BTMS transmissions coming from the sensors over the same measuring channels of the group of conductors so that there is no time overlap between the TPIS and BTMS transmissions.

10. A device according to claim 8, wherein the signal processing multiplexing means is operative to send the temperature data to a second measuring channel of the same group of conductors so that, by successive circular permutations, it is possible to use the BTMS data at the same time as the TPIS data.

11. A device according to claim 1, wherein the BTMS computer and the TPIS computer comprise separate asynchronous computers.

12. A device according to claim 11, wherein the multiplexing means comprise means connected to each temperature sensor and responsive to the presence of a supply frequency in the measuring channel of the respective temperature sensor connected thereto, for suppressing the transmission coming from that temperature sensor so that the signal coming from that temperature sensor and sent to the measuring channel therefor is interrupted each time said measuring channel is used by the TPIS supply.

13. A device according to claim 1, wherein the groups of conductors are constituted by conventional groups of conductors in the form of twisted pairs of conductors.

* * * * *